United States Patent
Christoph

(10) Patent No.: US 6,856,381 B2
(45) Date of Patent: Feb. 15, 2005

(54) METHOD FOR CARRYING OUT THE NON-CONTACT MEASUREMENT OF GEOMETRIES OF OBJECTS

(75) Inventor: Ralf Christoph, Giessen (DE)

(73) Assignee: Werth Messtechnik GmbH, Giessen (DE)

( * ) Notice: Subject to any disclaimer, the term of this patent is extended or adjusted under 35 U.S.C. 154(b) by 0 days.

(21) Appl. No.: 10/311,349

(22) PCT Filed: Jul. 13, 2001

(86) PCT No.: PCT/EP01/08088

§ 371 (c)(1),
(2), (4) Date: Jan. 6, 2003

(87) PCT Pub. No.: WO02/06765

PCT Pub. Date: Jan. 24, 2002

(65) Prior Publication Data

US 2003/0098967 A1 May 29, 2003

(30) Foreign Application Priority Data

Jul. 13, 2000 (DE) .......................................... 100 34 242
Oct. 4, 2000 (DE) .......................................... 100 49 303

(51) Int. Cl.$^7$ ............................. G01C 3/08; G01B 11/24
(52) U.S. Cl. ..................................... 356/4.05; 356/609
(58) Field of Search ............................... 356/405, 609, 356/4.05

(56) References Cited

U.S. PATENT DOCUMENTS

| 3,719,421 | A | * | 3/1973 | Poilleux et al. |
| 3,847,485 | A | * | 11/1974 | Zanoli |
| 4,209,252 | A | * | 6/1980 | Arditty et al. |
| 4,611,917 | A | * | 9/1986 | Robieux et al. |
| 4,732,485 | A | * | 3/1988 | Morita et al. |
| 4,930,896 | A | * | 6/1990 | Horikawa |
| 5,910,660 | A | * | 6/1999 | Hodel et al. |

FOREIGN PATENT DOCUMENTS

| DE | 3613209 | 3/1988 |
| EP | 1532576 | 11/1978 |
| WO | WO 99/53268 | * 10/1999 |

* cited by examiner

Primary Examiner—Bernarr E. Gregory
Assistant Examiner—Brian K Andrea
(74) Attorney, Agent, or Firm—Dennison, Schultz, Dougherty & MacDonald

(57) ABSTRACT

Method for carrying out the non-contact measurement of geometries such as surfaces of objects, with a coordinate measuring machine with a laser beam that is projected onto a measuring point of the object via an optical system, and in which the light that is reflected or scattered by the measuring point is detected by a detector. The optical system includes a zoom lens, whose lens groups each are each motor-adjusted separately from each other in positions for working distance and/or resolution and/or measuring range.

10 Claims, 6 Drawing Sheets

Figure 1:
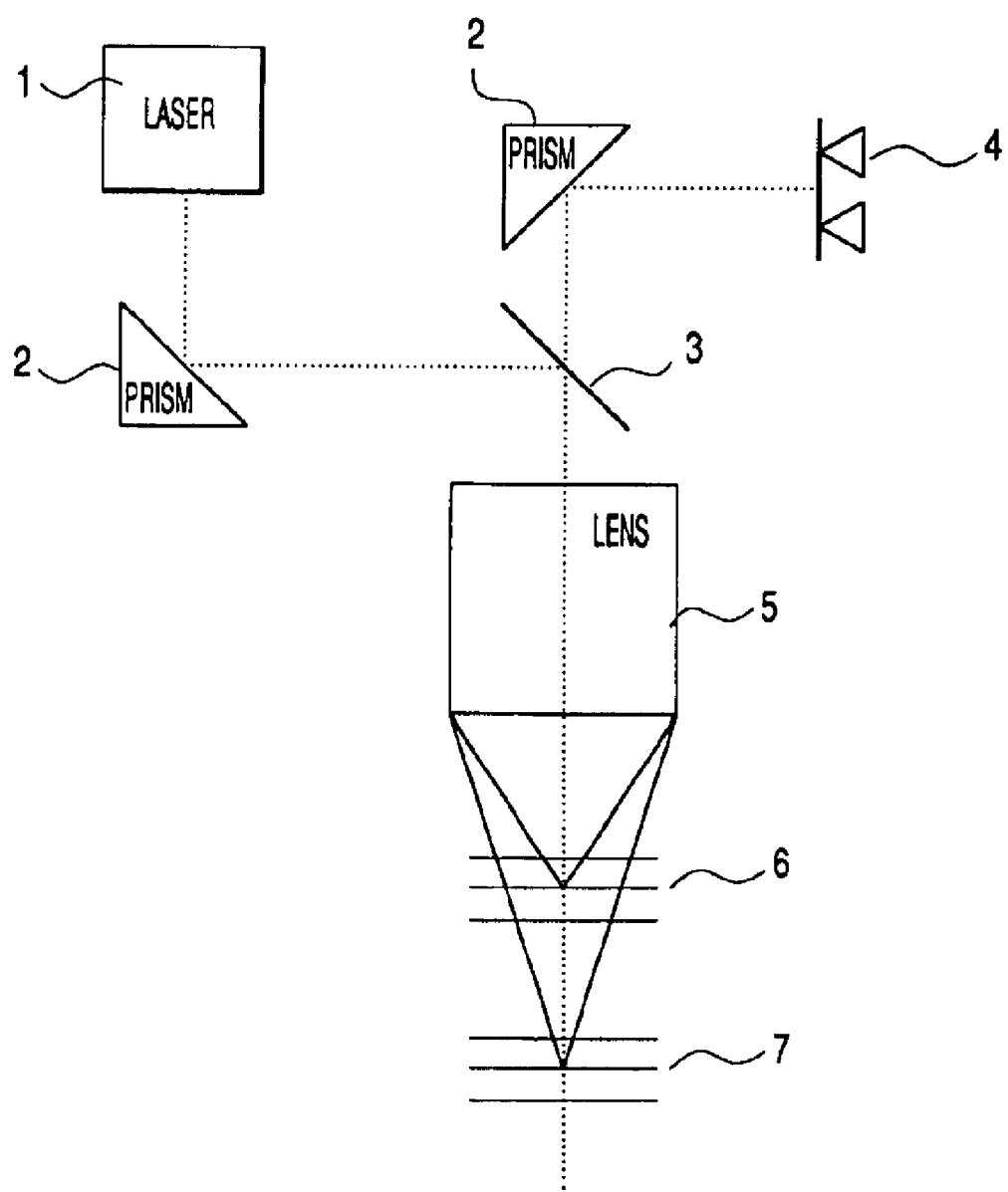
Figure 2A:
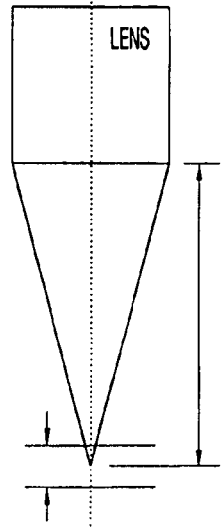
Figure 2B:
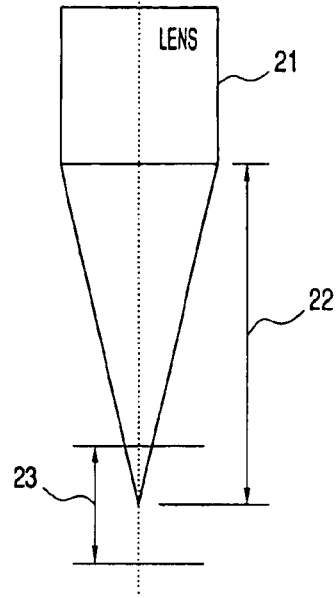
Figure 2C:
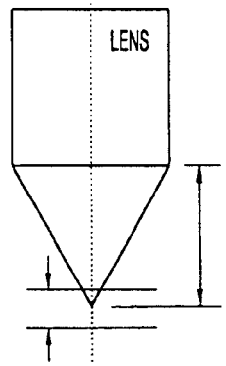
Figure 2D:
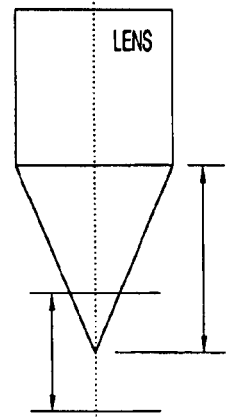

|   |                  | a) | b) | c) | d) |
|---|------------------|----|----|----|----|
| 1 | Enlargment       | ↑  | ↓  | ↑  | ↓  |
| 2 | Working Distance | ↑  | ↑  | ↓  | ↓  |
| 3 | Measuring Range  | ↓  | ↑  | ↓  | ↑  |
|   | Accuracy         | ↑  | ↓  | ↑  | ↓  |

METHOD FOR CARRYING OUT THE NON-CONTACT MEASUREMENT OF GEOMETRIES OF OBJECTS

The invention relates to a method for carrying out the non-contact measurements of geometries such as surfaces of objects, with a coordinate measuring machine with a laser beam that is projected onto a measuring point of the object via an optical system, and wherein the light that is reflected or scattered by the measuring point is detected by a detector.

For optoelectronic distance measurements for example the laser triangulation principle or the laser autofocus method can be employed. With the latter, for example the beam of an infrared laser diode can be adjusted parallel with a collimator lens and be focused onto the surface of the object or test item by a guidable scanning lens. The light that is reflected or scattered from there runs through the scanning and the collimator lenses in the opposite direction. A beam splitter prism directs a portion of this beam, which is focused again by the collimator lens, onto a focus detector. When the focal point is located in the focus detector plane, it is symmetrical between focus detector segments so that both provide an equal signal to the electronic evaluation system.

If however the focal point is located in front of the focus detector plane, light shines basically only on one of the focus detector segments in the form of a blurred semi-circle of confusion. Vice versa, the beam focal point shifts to the other segment when the focal point is located behind the focus detector plane. The signals of the focus detector segments then result in a control signal for guiding the scanning lens. This can occur with a dynamic motor so that the scanning lens always remains focused on the test object surface. In other words, the lens follows the profile of the test object. The vertical motion is then registered as the measurement signal by a distance sensor such as an inductive sensor. To prevent varying reflection factors of the test object surface from influencing the measurement results, a second detector can perform an intensity measurement, which normalizes the signal of the focus detector.

Apart from the above-described method for influencing beams in the detector device, for example also the Foucault knife-edge test principle can be employed, based on which half of the optical beam path is shadowed with the help of an optical knife-edge. Depending on whether the beam meets the object in front of or behind the focus detector plane, the left or the right portion of the reflected measuring beam is depicted on a detector like a double photodiode.

Instead of the knife-edge a splitting prism can also be used in connection with two photodiode sets. The possibility of employing a cylindrical lens in connection with a photodiode set is also available. In this respect, however, reference is made to adequate measuring methods.

The familiar distance measuring methods based on the autofocus principle have firm optics, wherein it should be selected whether a high resolution with a low measuring range or a low resolution with a larger measuring range is desired. The working distance itself is of course constant.

From WO 99/53268 (DE 198 16 270 A1) we know of a method with an arrangement for detecting the geometry of objects with a coordinate measuring machine. During this process an optical system with a zoom lens is used whose lens groups each are power driven and be adjusted separately in positions for the imaging scale and the distance to the object.

With a corresponding method a large application range for measuring the geometry of objects is feasible, wherein with little effort light is projected as a function of the geometry and is depicted on a detector.

DE 26 11 639 A1 describes a control device for lenses with variable focal lengths for cinematographic purposes.

DE 36 13 209 C2 refers to an optical surface profile measuring device, which comprises several detection systems with beam splitters.

In a multiple sensor scan device pursuant to DE 197 47 027 A1 a laser probe is provided apart from a tactile probe and a video scanner. For this, the scanner systems are arranged to detect the same measuring point.

The present invention is based on the task of further developing a method of the above kind such that its field of application can be expanded with simple measures. It should also offer the opportunity of combining the method with other conventional optical methods known from coordinate measuring machines.

Pursuant to the invention the problem is resolved largely through the fact that the optical system comprises a zoom lens, whose lens groups are each motor-adjusted separately from one another in positions for working distance and/or resolution and/or measuring range.

This way the lens groups can be motor-adjusted separately from one another in positions for working distance and/or working distance and resolution and/or measuring range and/or working distance and measuring range and resolution.

Deviating from previously known laser distance measuring methods, there is the possibility—due to the lens group of the zoom optics that can be adjusted separately from one another—of modifying the working distance, wherein the resolution can also be improved and the measuring range be increased. By contrast, based on the state of the art, a compromise must be made between the quality of the resolution and the size of the measuring range.

The invention offers in particular the following possibilities for technical realization:

- adjustment of the working distance of the laser through the zoom optics and scanning through the coordinate measuring device,
- modification of the working distance of the laser and thus control process directly through zoom optics,
- combination with image processing beam path in one beam path,
- compact attachment unit for image processing and laser due to pivot joint,
- additional integration of bright field-incident light through splitter mirror,
- integration of the laser beam in the image processing beam path without complete splitter through color-selective splitter or alternatively through "narrow mirror",
- usage of the laser for measuring the third coordinate of a fiber probe,
- generation of inherent light of the ball with fiber probe.

Based on the idea of the invention a zoom lens with an adjustable working distance is used not only for the formation or detection of a beam spot, light spot, or contrast transition, but the lens is used simultaneously for the projection of a mark, an edge, a beam spot, especially a Foucault knife-edge. It is therefore possible due to the idea of the invention to modify the optical parameters working distance, resolution, measuring range and imaging scale simultaneously or identically both for the projection of the laser beams required for the laser distance measuring methods and for the projection of the resulting image on the object. Due to the idea of the invention, not two optics are required with differing working distances, as is required based on the state of the art, but with the zoom lens that is provided pursuant to the invention a realization is possible.

Pursuant to the invention the user has different working distances of the laser sensor with the associated differing measuring ranges and accuracies available. Thus operating modes for high scanning speeds can be used selectively with a large measuring range and less accurate measuring results, and slower scanning speeds with small measuring ranges and highly accurate results.

During the normal scanning operation of measuring sensor with coordinate measuring machines, the measuring sensor is adjusted by the mechanical axis of the coordinate measuring machine in accordance with its measuring signal. Due to the idea of the invention and the associated conditionally gained functionality of the variable working distance, the scanning of objects can take place also without moving the coordinate axis. This way, in dependency upon the excursion of the sensor, only the working distance is modified. The measuring result is gained by reading the working distance and in combination with the reading results of the coordinate axes of the coordinate measuring machine.

When another beam splitter is introduced into the image path, there is the possibility of combining the measurement of the distance to the measuring object, which takes place quickly pursuant to the idea of the invention, with the possibilities of image processing for the purpose of measuring the dimensions in the image plane. In order to avoid possibly conditional intensity losses in the image processing or laser beam path in the respective operating mode, the beam splitters like mirrors can be designed mechanically such that they can be swiveled or tilted out of the beam path. There is also the possibility of performing a separation of both beam paths through color-selective filters.

In order to additionally increase the flexibility of the measuring method and application possibilities opened up by the idea of the invention one embodiment of the invention provides for the entire sensory mechanism to be arranged on the pivot/swivel joint of a coordinate measuring machine.

There is also the possibility of using the laser light for generating inherent light of a scanning element of an opto-tactile scanner, as the one revealed in WO 99/53268, whose disclosure content is hereby referenced.

Furthermore the laser distance sensors pursuant to the invention allow the position of an opto-tactile scanner, as the one described in WO 99/53268, to be determined in the Z-direction of the coordinate measuring machine.

Independent of this, an independent suggestion of the invention provides for a method for measuring geometries such as the surfaces of objects with a coordinate measuring machine comprising an opto-tactile scanner with a scanner extension as well as a scanning element extending from there for measuring the object, which also comes into contact with it, as well as possibly a reticle and an optical sensor for determining the position of the scanning element and/or the reticle in one plane (x-y axes of the coordinate measuring machine), characterized by the fact that with a laser distance sensor the position of the scanning element and/or of the reticle can be determined in the direction vertical to the plane (y-axis of the coordinate measuring machine).

Additionally the working direction of the laser distance sensor can be modified selectively via an interchangeable additional mirror.

Further details, benefits and features of the invention result not only from the claims, the features revealed by them—by themselves and/or in combination—but also from the following description of the preferred embodiment shown in the drawing.

Figure 3A:
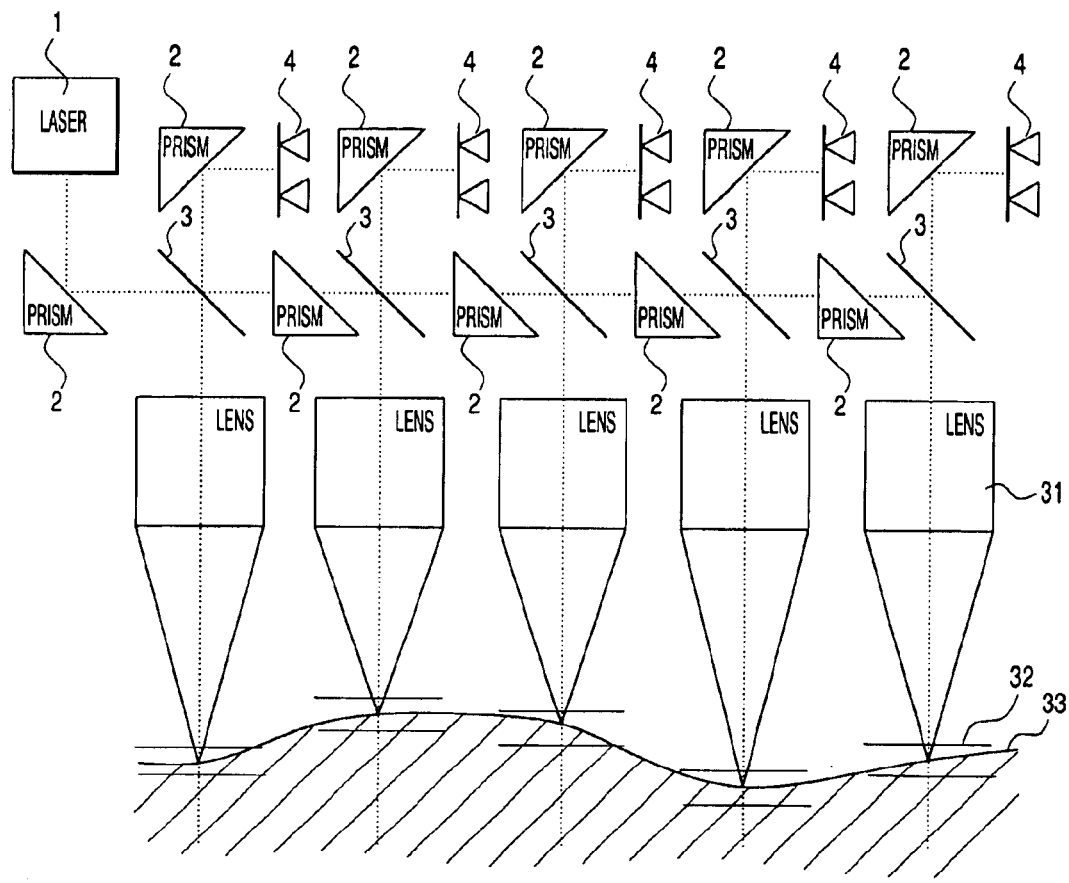
Figure 3B:
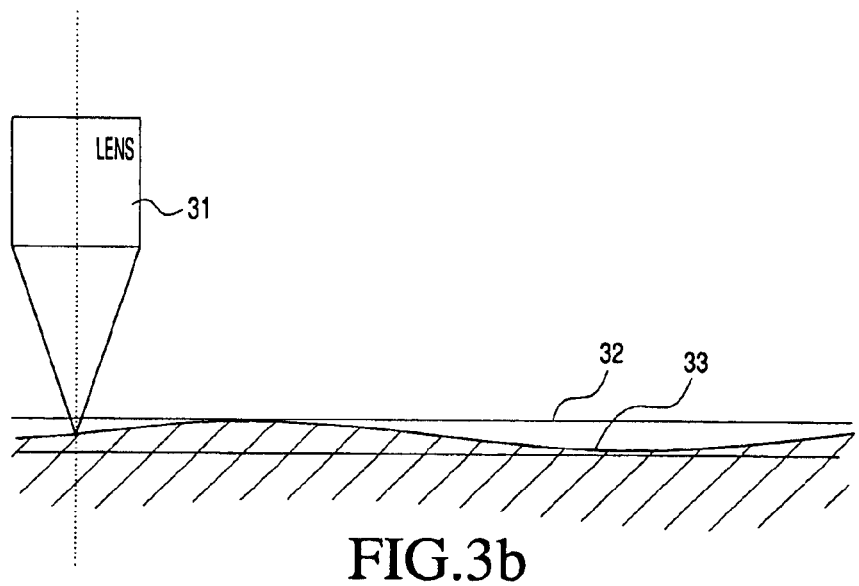
Figure 4:
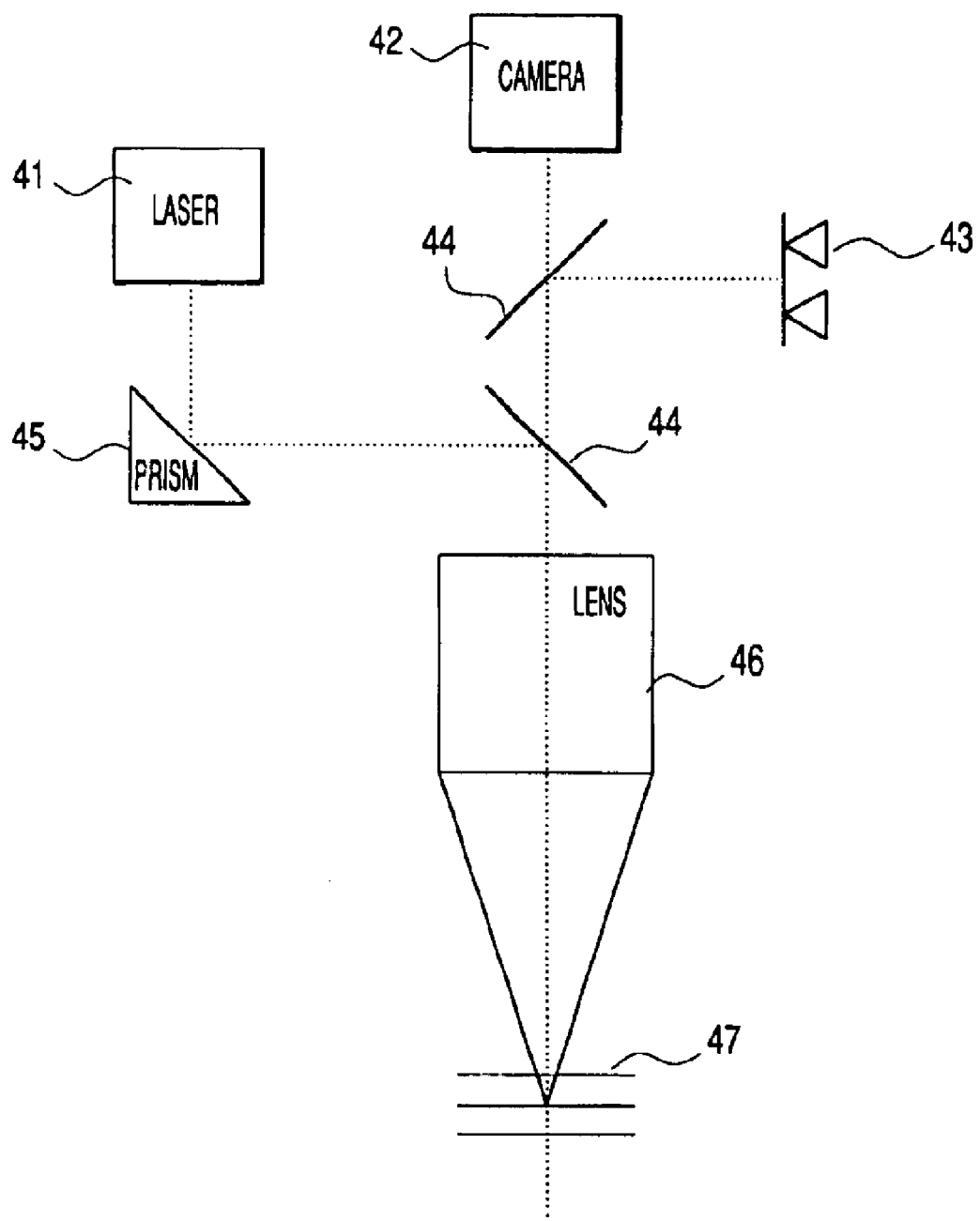
Figure 5:
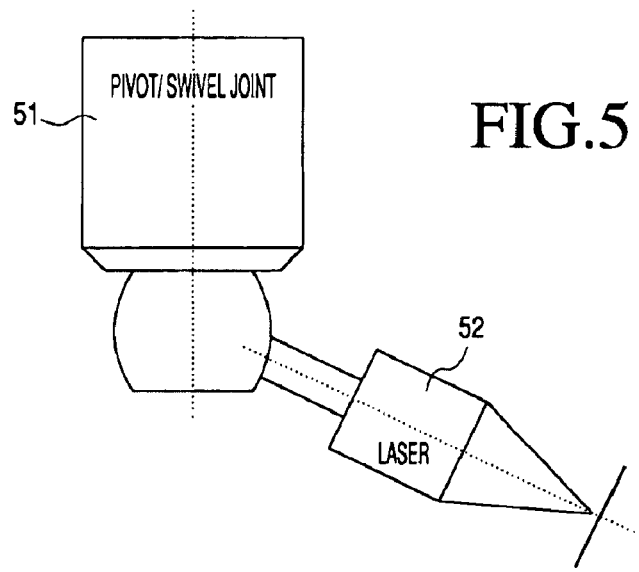
Figure 6:
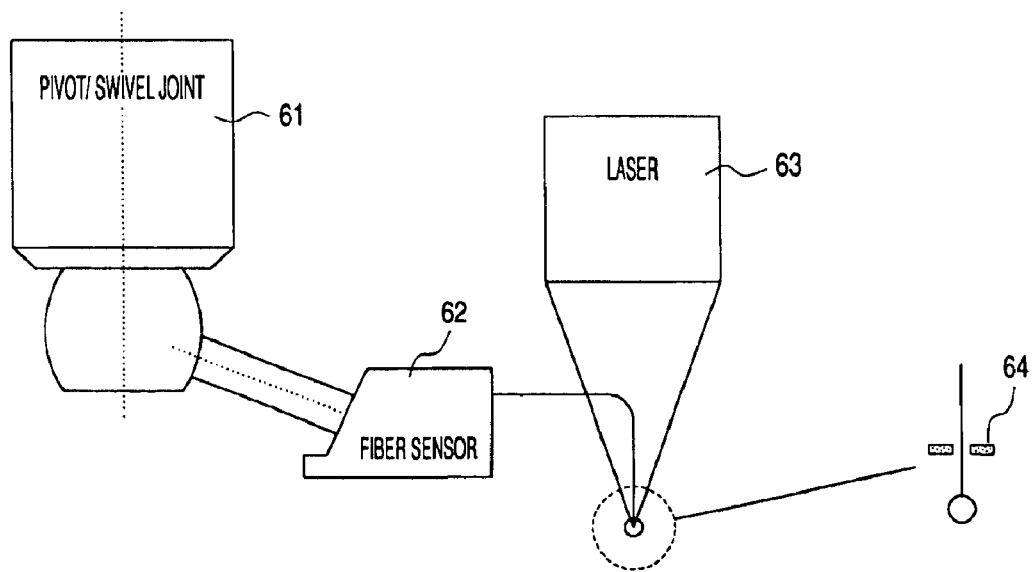
Figure 7:
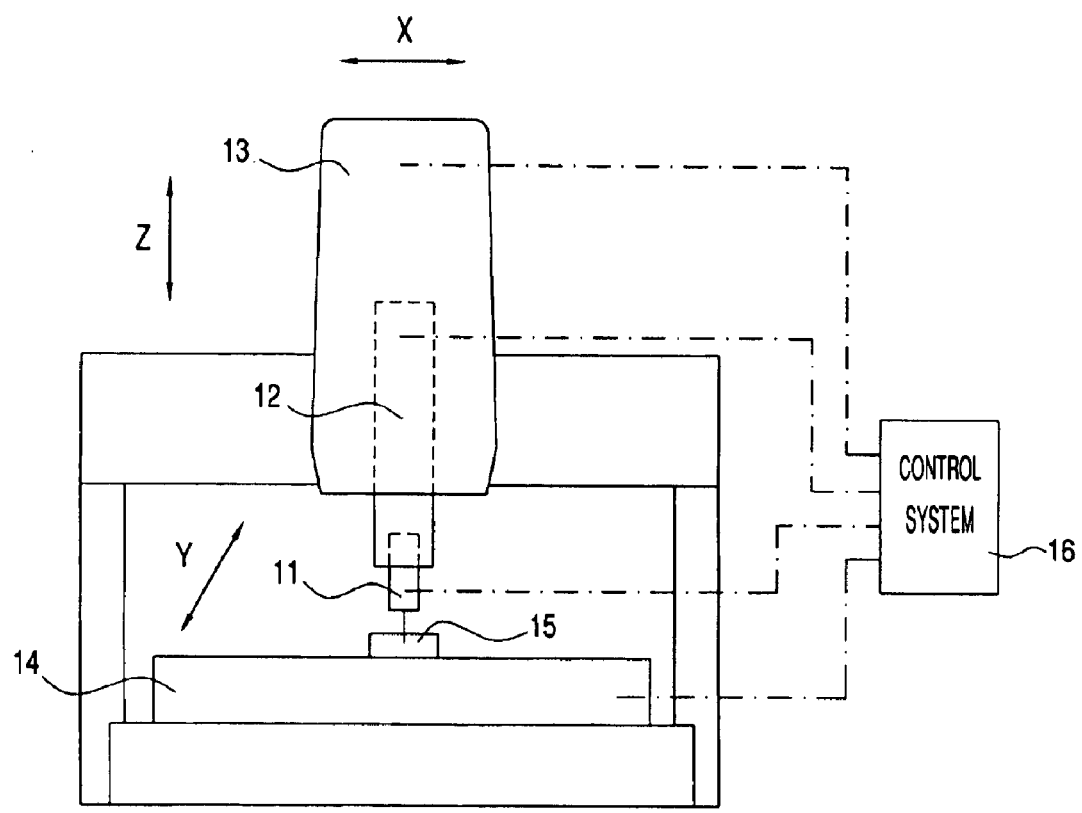

It shows:

FIG. 1 a basic depiction of a laser sensor for measuring the surfaces of objects, FIG. 2 basic depiction of measuring ranges, which can be covered with the laser sensor pursuant to FIG. 1, FIG. 3a, 3b comparison of measuring ranges that can be covered with the invented laser sensor to those of a laser sensor according to the state of the art, FIG. 4 a laser sensor pursuant to FIG. 1 with an additional beam splitter, FIG. 5 a pivot-swivel joint with laser sensor, FIG. 6 a pivot/swivel joint with laser sensor as well as fiber probe and FIG. 7 a basic depiction of a coordinate measuring machine.

Pursuant to the invention a coordinate measuring machine for carrying out the non-contact measurement of geometries of surfaces of objects with a laser beam is suggested, wherein said beam is projected via an optical system onto a measuring point of the object and light that is reflected from the measuring point is detected by a detector or sensor. Pursuant to the invention, a zoom lens with variable working distances is used for this not only for the depiction and/or detection of a beam spot, light spot or contrast transition, but simultaneously the lens is used for the projection of a mark, an edge, a beam spot and especially a Foucault knife-edge. This offers the opportunity of modifying the optical parameters working distance, resolution, measuring range and depiction scale simultaneously and identically, both for the projection of the laser beams required for laser distance measuring methods and for the projection of the resulting image on the object.

FIG. 1 shows the basic principle of a laser 1, whose beam is directed to a zoom lens 5 via a prism 2 and a semi-permeable mirror 3 in order to project the laser beam in various sharpness planes 6 and 7. The reflected light is guided through the semi-permeable mirror 3 for feeding it via another prism 2 to a sensor in the form of e.g. a differential photodiode 5.

As shown in FIG. 1 with the example of the laser sensor based on the Foucault principle, the zoom lens is used both for the projection of the image of the Foucault knife-edge that is introduced into the beam path via a mirror and for the projection of the resulting image of the measuring object onto the opto-electronic sensors 4, which as mentioned are designed as differential photodiodes in the example. Since the lens 5 allows the working distance and resolution and/or measuring range to be adjusted separately from one another, only one lens is required, which pursuant to the method of the state of the art would have necessitated two lenses to be able to realize the Foucault Principle with a variable working distance.

Consequently the user has different working distances of the laser sensor with the associated different measuring ranges and accuracy levels available. In this way operating modes can be used selectively, such as high scanning speeds with a large measuring range (capture range) (FIGS. 2b and 2d) and less accurate measuring results, and slow scanning speeds with a smaller measuring range (FIGS. 2a and 2c) and highly accurate results, as is shown based on FIG. 2. There 21 signifies the zoom lens assembly, 22 the working distances, and 23 the measuring range. In dependency upon the enlargement, working distance and measuring range, different accuracy levels develop, as is shown in the table in FIG. 2 (↑=large or larger, ↓=small, little or smaller, less).

Based on the state of the art, in a regular scanning operation the measuring scanners with coordinate measuring machines adjust the measuring scanner based on a measuring signal through the mechanical axis of the coordinate measuring machine. Due to the functionality of the variable working distance that is gained with the invention, the scanning of objects can take place also without movement of the coordinate axes. Only the working distance is modified as a function of the excursion of the sensor. The measuring result is gained by reading the working distance and in combination with the reading results of the coordinate measuring machine, as shown in FIG. 3a. Without the invented zoom lens on the other hand the process would result in a very limited measuring range due to the fixed distance sensor, as can be seen in FIG. 3b.

By introducing another beam splitter 44 into the image beam path pursuant to FIG. 4 it is possible to combine the measurement of the distance from the measuring object, which based on the invention takes place quickly, with the possibilities of image processing for the measurement of dimensions in the image plane. In order to avoid the resulting intensity losses in the image processing or laser beam path in the respective operating mode, the beam splitters 44 such as mirrors can be mechanically designed such that they can be swiveled or tilted out of the beam path. There is also the possibility of achieving a separation of the beam paths through color-selective filters.

In order to increase the flexibility of the described solution, there is furthermore the possibility to arrange the entire sensory mechanism on the pivot/swivel joint 51 of a coordinate measuring machine, as is indicated basically in FIG. 5.

FIG. 6 in turn shows in a basic image that the laser distance sensor designed pursuant to the invention can be used for carrying out measurements of the position of a mechanical scanning or sensory element in the direction of the optical axis (Z-direction of the coordinate measuring machine) of the laser distance sensor. As the sensory element a fiber probe should be preferred, as the one described in WO 99/53268, which we hereby reference expressly. To this extent, we would like to refer to the corresponding disclosure. In combination with the measuring results of an image processing system within the depiction plane thus a three-dimensional determination of the position of the sensory element can be accomplished. The sensory element 64 in the form of a ball can be equipped with a special surface for generating the laser image.

The inherent light effect of the fiber sensor ball created by the laser light can also simultaneously be used to detect its position through an image processing system.

Of course the determination of the position of the scanner in the Z-direction, i.e. vertical to the plane, in which the position determination of the scanner is performed with an optical sensor such as an image processing sensor, position-sensitive surface sensor or a video camera, can also be conducted with a conventional laser distance sensor. This should be regarded as a separate idea of the invention.

FIG. 7 shows an embodiment for the realization of the invented method. The laser distance sensor 11 with adjustable lens groups is fastened to a sleeve 12 (Z-axis) of a coordinate measuring machine. This sleeve 12 can slide in the x-direction with a slide 13. A measuring object 15 can also slide in the y-direction across a measuring table 14. All axes of the depicted coordinate measuring machine are motor-driven and are controlled by a control system 16. The starting signals of the laser distance sensor 11 are processed in the control system 16 such that the distance between laser distance sensor 11 and material surface is always kept constant. By moving one of the axes x or y, the scanning process across the measuring object 15 is accomplished. By adjusting the position of the lens group in the laser distance sensor 11, the working distance of the laser distance sensor 11 can be adjusted during scanning.

What is claimed is:

1. Method for carrying out the non-contact measurement of a surface of an object, comprising:

projecting a laser beam from a coordinate measuring machine onto a measuring point of the object via an optical system, adjusting a plurality of lens groups of a zoom lens assembly, wherein each of said plurality of lens groups is adjusted in zoom independently and separately by a motor for modifying a working distance, resolution and measuring range, and detecting the light reflected or scattered by the measuring point via detectors.

2. Method pursuant to claim 1, wherein the coordinate measuring machine in a scanning operation is controlled by starting signals or detecting.

3. Method pursuant to claim 2, characterized in that for the realization of the scanning operation the working distance of the optical system is modified specifically through a control process.

4. Method pursuant to claim 1, characterized in that additionally an image processing beam path is generated.

5. Method pursuant to claim 1, characterized in that laser, detector and/or optical system are positioned in the space with a swivel device.

6. Method pursuant to claim 1, characterized in that color-selective filters are used as splitter mirrors in a laser beam path.

7. Method pursuant to claim 6, characterized in that tilt or swivel mirrors are used as the splitter mirrors in the laser beam path.

8. Method pursuant to claim 1, further determining a third coordinate (Z-axis of the coordinate measuring machine) of an opto-tactile scanner through the laser, the optical system, and a laser distance sensor.

9. Method pursuant to claim 8, characterized in that laser light is used for generating the light of the opto-tactile scanner or its scanning elements.

10. Method pursuant to claim 1, characterized in that the working direction of the laser distance sensor can be modified selectively via an exchangeable additional mirror.

* * * * *